United States Patent [19]

Shoji et al.

[11] Patent Number: 5,128,435
[45] Date of Patent: Jul. 7, 1992

[54] MAGNETIC RECORDING MEDIUM BASED ON EPOXY RESINS MODIFIED BY ISOCYANATES WITH POLY(PERFLUOROETHER) BACKBONES

[75] Inventors: Mitsuyoshi Shoji, Ibaraki; Takayuki Nakakawaji, Hitachi; Yutaka Ito, Takahagi; Shigeki Komatsuzaki, Mito; Toshikazu Narahara, Ibaraki, all of Japan

[73] Assignee: Hitachi, Ltd., Tokyo, Japan

[21] Appl. No.: 552,514

[22] Filed: Jul. 16, 1990

Related U.S. Application Data

[63] Continuation of Ser. No. 261,844, Oct. 25, 1988, abandoned.

[30] Foreign Application Priority Data

Oct. 27, 1987 [JP] Japan ................ 62-269318

[51] Int. Cl.$^5$ ............ C08G 59/42; C08G 59/50; C08G 59/62; C08G 59/66
[52] U.S. Cl. .................... 528/70; 528/45; 528/401; 525/109; 525/481; 525/486; 525/504; 428/413; 428/422.8; 428/900
[58] Field of Search ............ 428/413, 422.8, 900; 525/109, 481, 486, 504; 528/45, 70, 401

[56] References Cited

U.S. PATENT DOCUMENTS

| | | | |
|---|---|---|---|
| 3,442,974 | 5/1969 | Bremmer | 528/119 |
| 3,490,946 | 1/1970 | Wolff | 428/327 |
| 3,778,308 | 12/1973 | Roller et al. | 428/421 |
| 4,120,995 | 10/1978 | Phipps et al. | 427/387 |
| 4,816,545 | 3/1989 | Re et al. | 528/401 |

Primary Examiner—John C. Bleutge
Assistant Examiner—Frederick Krass
Attorney, Agent, or Firm—Antonelli, Terry, Stout & Kraus

[57] ABSTRACT

A resin composition comprising an epoxy resin and an isocyanate group-containing fluorine compound is particularly suitable for covering a magnetic recording medium comprising a non-magnetic substrate and formed thereon a thin magnetic film so as to give excellent sliding durability.

11 Claims, No Drawings

MAGNETIC RECORDING MEDIUM BASED ON EPOXY RESINS MODIFIED BY ISOCYANATES WITH POLY(PERFLUOROETHER) BACKBONES

This is a continuation of application Ser. No. 07/261,844, filed Oct. 25, 1988, now abandoned.

BACKGROUND OF THE INVENTION

This invention relates to a magnetic recording medium excellent in durability and a resin composition used therefor.

Magnetic discs are applied to a variety of fields of devices using large capacity information recording and reproducing devices. Typical examples are floppy discs and hard discs for digital signal recording devices. These magnetic discs are required to have larger recording capacity and reliability durable for a long period of operation. Magnetic discs are subjected to writing and reading out information while conducting an operation of sliding on a head. In a particular case, there is a device wherein a magnetic disc is not slided on a head but kept in a very narrow distance to write and read out information. Even in such a case, it is admitted that a head contacts with a magnetic disc by sliding in a certain probability. An increase of memory capacity inevitably requires severe sliding conditions, since the distance between the head and disc becomes narrower and the probability of contacting and sliding becomes higher. Thus, the improvement of durability is inevitable element. At present, there is no magnetic discs having sufficient durability.

In order to improve the durability, lubricants are used to reduce friction and wear at the time of sliding. According to a known method, a lubricant such as a long-chain fatty acid derivative, e.g. oleic acid, stearic acid, etc. is impregnated into a magnetic recording medium layer of a magnetic disc. This method is usually applied to magnetic recording media obtained by coating a mixture of magnetic powder and a binder. But the lubricating effects under severe sliding conditions cannot be expected sufficiently and thus it is difficult to expect lubricating properties for a long period of time.

In order to improve this, there are proposed to coat fluorine-containing lubricants more excellent in lubricating properties on magnetic disc surfaces (U.S. Pat. Nos. 3,490,946 and 3,778,308). According to these coating methods of lubricants, a great effect may be expected at the initial time, but the lubricants are gradually released from the disc surfaces to undesirably reduce the lubricating effect when used for a long period of time, due to high speed revolution of the magnetic disc.

On the other hand, in order to prevent the release of lubricants at initial time, there are proposed to coat fluorine-containing surface active agents enhanced in adsorption on the magnetic recording medium surfaces (Japanese Patent Unexamined Publication Nos. 59-116931, 58-41431, 58-29147, 57-154619, and 57-44226). The fluorine-containing surface active agents are, for example, compounds represented by the formula:

wherein n is an integer of 4 to 13; X is a polar group such as —SO Me (Me=k or Na), —SO$_2$F, —COONH$_4$, —COOH, —SO$_3$H, or —OH, as disclosed in Japanese Patent Unexamined Publication No. 58-29147 But since these fluorine-containing surface active agents are not fixed strongly on the surface, they are flown out from the sliding surface at the time of sliding, which results in not sufficiently improving durability of magnetic discs and also not improving durability of memory devices.

Further, in order to prevent the release of lubricants at initial time, there are proposed to fix the fluorine-containing lubricants to the surfaces of magnetic recording media using a compound of the formula:

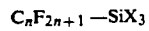

wherein n is an integer of 4 to 13; X is a halogen, a nitrile group or an alkoxy group (U.S. Pat. No. 4,120,995, Japanese Patent Unexamined Publication Nos. 54-36171, 59-203239, 60-38730, 59-172159, and 61-39919). According to these methods, considerable durability can be expected since the lubricants are fixed to the magnetic recording medium surfaces by chemical reactions, but there are defects in that the reactions are difficult and it is very difficult to obtain uniform reacted films. In practical production processes, the application is very difficult. Further, since the fluorine chain length is too short, the lubricating effects are not so good, which results in not sufficiently improving the durability of magnetic recording media.

It is also proposed to use phosphorus-containing compounds of the formula:

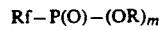

wherein Rf is a perfluoroalkyl group; R is $C_zH_{2z+1}$; m is zero or an integer of 1 or 2; and Z is zero or an integer of 1 to 3 (Japanese Patent Unexamined Publication Nos. 60-109028, 60-101717, and 60-246020. These lubricants react with surfaces of metal films or oxidizing films of disc surfaces to be fixed. But since the fluorine-containing chains of these lubricating films are short, effects other than those of surface active agents can hardly be expected, and the durability is still insufficient.

SUMMARY OF THE INVENTION

It is an object of the present invention to provide a magnetic recording medium overcoming the defects as mentioned above.

This invention provides a magnetic recording medium comprising a non-magnetic substrate and formed thereon a thin magnetic film, said thin magnetic film being covered with a film made from a resin composition comprising an epoxy resin and an isocyanate group-containing fluorine compound represented by the formula:

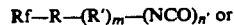

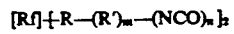

wherein Rf is a perfluoropolyoxyalkyl group; R is a group of the formula: —CONH—, —OCONH—, or —CH$_2$OCONH—; R' is a bivalent or trivalent saturated aliphatic hydrocarbon or aromatic hydrocarbon group; m is zero or an integer of 1 or more; and n is an integer of 1 or 2, or an isocyanate group-containing fluorine compound represented by the formula:

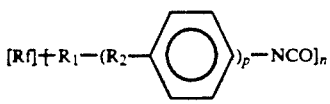

wherein Rf is as defined above; $R_1$ is a direct bond, or —$CH_2$—, —CO— or an amido bond; $R_2$ is a direct bond, or an ether bond, an ester bond, an amido bond, or —$OC_kH_{2k}$—, these bonds being able to be different ones when repeated; P is an integer of 1 or more; and n and k are independently an integer of 1 or 2.

This invention also provides a resin composition comprising an epoxy resin and an isocyanate group-containing fluorine compound represented by the formula:

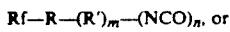

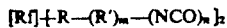

wherein Rf, R, R', m and n are as defined above, or an isocyanate group-containing fluorine compound represented by the formula:

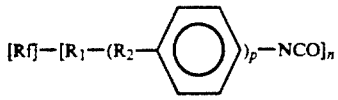

wherein Rf, $R_1$, $R_2$, p and n are as defined above.

DESCRIPTION OF THE PREFERRED EMBODIMENTS

The magnetic recording medium of the present invention is improved in durability and also effective for improving sliding durability of a head.

In order to enhance the sliding durability of magnetic recording media, it is necessary to make a lubricant present on the surface of the magnetic recording media, said lubricant being able to lessen a friction coefficient and to lessen a wear rate. Reactive type fluorine-containing lubricants heretofore proposed are effective to some extent, but insufficient in the sliding durability and difficult in the fixing method thereof.

In contrast, according to the present invention, since a special isocyanate group-containing fluorine compound is used together with an epoxy resin to form a film on the thin magnetic film, long chain perfluoropolyoxyalkyl groups having the above-mentioned effect as a lubricant can be fixed on the surface only by curing with heating.

That is, in the present invention, the thin magnetic film is covered with a film made from a resin composition comprising an epoxy resin and an isocyanate group-containing fluorine compound represented by the formula:

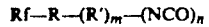      (I)

or

      (II)

wherein Rf is a perfluoropolyoxyalkyl group; R is a group of the formula —CONH—, —OCONH— or —$CH_2$OCONH—; R' is a bivalent or trivalent saturated hydrocarbon group which may contain one or more isocyanate groups, and preferably has 5 to 20 carbon atoms, or a bivalent or trivalent aromatic hydrocarbon group preferably represented by the formula:

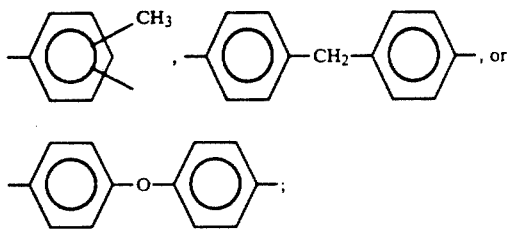

m is zero or an integer of 1 or more, preferably an integer of 1; and n is an integer of 1 or 2, or an isocyanate group-containing fluorine compound represented by the formula:

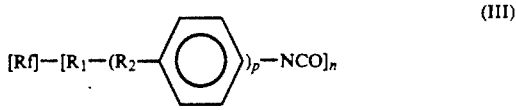 (III)

wherein Rf is as defined above; $R_1$ is a direct bond, or —$CH_2$—, —CO— or an amido bond; $R_2$ is a direct bond, or an ether bond, an ester bond, an amido bond or —$OC_kH_{2k}$—, these bonds being able to be different ones in each repeating; p is an integer of 1 or more, preferably an integer of 1 to 3; and n and k are independently an integer of 1 or 2.

Preferable examples of the perfluoropolyoxyalkyl group (Rf) are as follows $F[CF(CF_3)-CF_2-O-]_x-CF(CF_3)-$, $\{F[CF(CF_3)-CF_2-O-]_x-(CF_2O)_y-(CF_2)_z-\}-$, $[(C_2F_4O)_y-(CF_2O)_z-CF_2]-$ In the above formulae, x, y and z are independently an integer of 1 or more, and y is preferably an integer of to 25 and z is preferably an integer of 10 to 56.

F—[—CF(CF_3)—CF_2—O—]_x—(CF_2—O—)_y—,
X—(CR'R''≤CF_2—CF—O—)_x—,
X=F—, I—, CF_3—, CF_3CF_2—O—, (CF_3)_2—CF—O—, or CF_3—O—CF(CF_3)—CF_2—O—
R'=H or F
R''=H or F
X'—(C_3F_6—O—)_m—(CF_2—O—)_n—[CF(CF_3)—O—]_x—X'=CF_3—O—, C_2F_5—O—, or C_3F_7—O—.

In the above formulae, m is an integer of 15 to 100; n is an integer of 1 to 80; z is an integer of 1 to 9; and x and y are as defined above.

Preferable examples of the isocyanate group-containing fluorine compounds of the formulae (I), (II) and (III) are as follows:

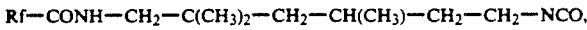

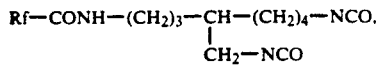
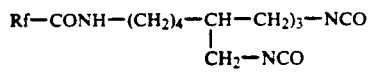
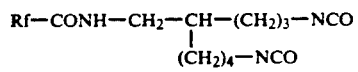
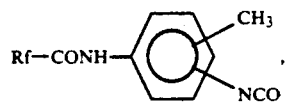
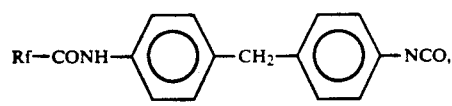
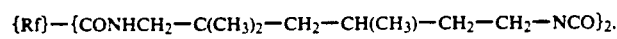
{Rf}—{CONHCH$_2$—C(CH$_3$)$_2$—CH$_2$—CH(CH$_3$)—CH$_2$—CH$_2$—NCO}$_2$.
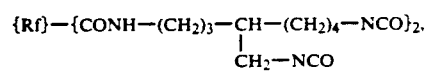
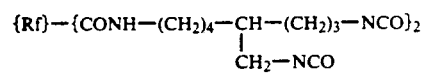
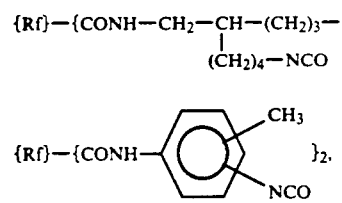
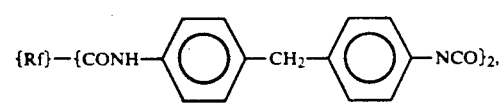
Rf—CH$_2$OCONH—CH$_2$C(CH$_3$)$_2$—CH$_2$CH(CH$_3$)—CH$_2$CH$_2$—NCO,
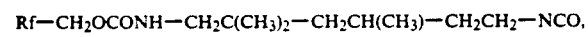
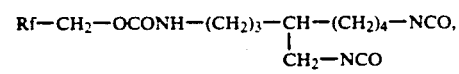
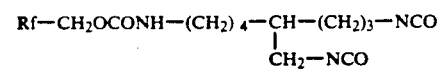
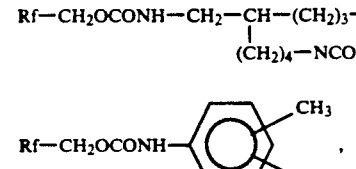
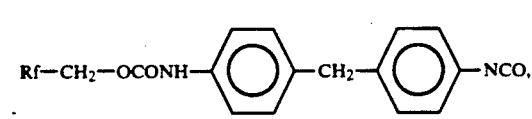
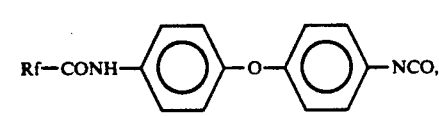

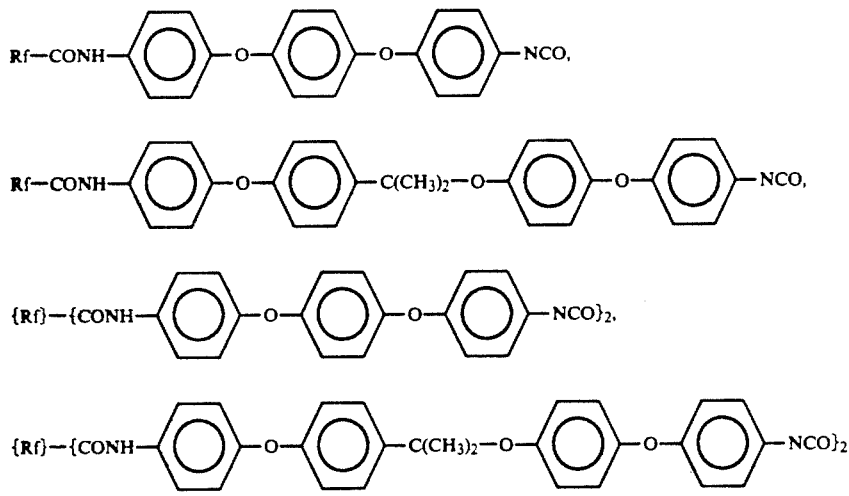

These compounds can be used alone or as a mixture thereof.

It is preferable to mask one or more isocyanate groups of the above-mentioned fluorine compounds with a phenol such as phenol, cresol, xylenol or the like. It is also possible to use primary amines and alcohols as a masking agent. In this case, it is possible to use a mask stabilizer such as acetyl acetone. When masked, a reaction begins after heating.

As the isocyanate group-containing fluorine compounds, it is possible to use oligomers thereof such as dimers and trimers thereof.

As the epoxy resin, there can be used bifunctional or polyfunctional epoxy resins. Examples of these epoxy resins are bifunctional epoxy compounds such as diglycidyl ether of bisphenol A, butadiene epoxide, 3,4-epoxycyclohexylmethyl-(3,4-epoxy)cyclohexanecarboxylate, vinylcyclohexene dioxide, N,N-m-phenylene-bis(4,5-epoxy-1,2-cyclohexanedicarboxyimide), 4,4'-di(1,2-epoxyethyl)diphenyl ether, 4,4'-(1,2-epoxyethyl)-biphenyl, 2,2'-bis(3,4-epoxycyclohexyl)propane, bis(2,3-epoxycyclopentyl) ether, 2-(3,4-epoxy)cyclohexane-5,5'-spiro(3,4-epoxy)cyclohexane-m-dioxane, bis-(3,4-epoxy-6-methylcyclohexyl) adipate, etc.; tri- or polyfunctional epoxy compounds such as glycidyl ether of N,N-bisglycidyl-p-aminophenol, polyallyl glycidyl ether, 1,3,5-tri(1,2-epoxyethyl)benzene, polyglycidyl ether of phenol novolac, triglycidyl ether of trimethylolpropane, 2,2',4,4'-tetraglycidoxybenzophenone, tetraglycidoxytetraphenylethane, etc. These epoxy resins can be used alone or as a mixture thereof. As a hardener for the epoxy resin, there can be used phenols such as a phenol-formaldehyde condensate, an o-cresol-formaldehyde condensate, p-cresol-formaldehyde condensate, a xyleneformaldehyde condensate, a chlorophenol-formaldehyde condensate, a tert-butylphenol-formaldehyde condensate, a p-octylphenol-formaldehyde condensate, a p-hydroxystyrene polymer, etc.; amines such as N-aminoethylpiperadine, m-xylylenediamine, 1,3-bis(aminomethyl)cyclohexane, p-menthanediamine, 1-amino-3-aminomethyl-5-dimethyl-cyclohexane, bis(4-amino-3-methylcyclohexyl)methane, 2-ethyl-4-methylimidazole, m-phenylenediamine, 4,4'-diaminodiphenylmethane, dicyandiamide, etc.; isocyanates such as methane diisocyanate, butane 1,1'-diisocyanate, trivinylene diisocyanate, pentane 1,5-diisocyanate, diphenylsilane diisocyanate, $\omega,\omega'$-1,3-dimethylbenzene diisocyanate, cyclohexane 1,3-diisocyanate, diphenyl ether 4,4'-diisocyanate, bisphenyl ether 4,4'-diisocyanate, triphenylmethane triisocyanate, tris(4-phenylisocyanate thiophosphate), etc.; thiophenols such as a thiophenolformaldehyde condensate, etc.; polyamides such as a polyamide having a terminal amine obtained from a dimer of linoleic acid and ethylenediamine, an aliphatic amide having a terminal amine, etc. Among these hardeners, the use of a phenol resin is preferable. Examples of the phenol resin are resol type and novolac type phenol resins, polymerized p-vinylphenol (e.g. Resin M mfd. by Maruzen Petrochemical Co., Ltd.).

In the resin composition of the present invention, it is preferable to contain 0.01% to 30% by weight of the isocyanate group-containing fluorine compound based on the weight of the epoxy resin.

The resin composition comprising an epoxy resin and an isocyanate group-containing fluorine compound, and if necessary a hardener for the epoxy resin can be used as a varnish, an adhesive, a molding material, a laminate, and the like.

When the resin composition is used for covering magnetic recording media so as to improve the sliding durability, it is dissolved in an organic solvent to form a varnish, which is coated on a thin magnetic film formed on a non-magnetic substrate by a conventional method.

As the organic solvent, there can preferably be used polar solvents such as methyl ethyl ketone, cyclohexanone, N,N-dimethylformamide, ethylene glycol methyl ether, etc.

When a coating film is formed on the thin magnetic film, perfluoropolyoxyalkyl groups of the fluorine compound are selectively exposed and oriented on the coated surface. When heated, the mask of isocyanate groups is removed and the isocyanate groups react themselves for forming isocyanurate rings, and also react with epoxy groups and bond to the epoxy resin via oxazolidone rings. Such a structure, after cured, can be represented by the following repeating units of the formula:

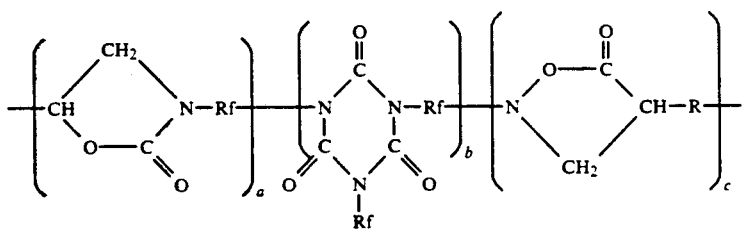

wherein Rf is an isocyanate residue containing bifunctional perfluoropolyether group as a main chain; R is a polyfunctional epoxy residue; and a, b and c are independently an integer of 1 or more.

Further, it is also possible to take a structure of repeating units represented by the formula:

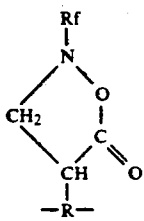

wherein Rf and R are as defined above.

As mentioned above, since the coated surface is covered with the perfluoropolyoxyalkyl groups having a lubricating function, excellent lubricating effect can be maintained for a long period of time to sufficiently improve the durability of the coated film.

The non-magnetic substrate and the thin magnetic film of the magnetic recording medium of the present invention are not special ones and conventional ones can be used. For example, there can be used magnetic discs such as continuous medium discs produced by forming a Ni-P plating layer (an undercoating layer) on a disc substrate made of an aluminum alloy, and forming sputtered films of Cr, Co-Ni and carbon, in this order, with 50 to 1000 nm thick, respectively; coating type discs produced by coating a varnish comprising a magnetic powder and a binder on a disc substrate made of an aluminum alloy to form a film thereon.

This invention is illustrated by way of the following Examples.

EXAMPLE 1

In a 200-ml three-necked flask equipped with a dehydrating tube, and a reflux condenser, 22 g (0.01 mole) of a compound of the formula:

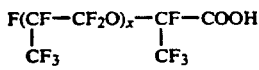

wherein x is 14 in average, (Krytox 157FS, a trade name, mfd. by E. I. du Pont de Nemours & Co.), sufficiently dehydrated over anhydrous magnesium sulfate and 100 g of trichlorotrifluoroethane sufficiently dehydrated over anhydrous magnesium sulfate were placed and sealed, followed by stirring.

On the other hand, Solution [I] was prepared by dissolving 2.5 g (0.01 mole) of diphenylmethane diisocyanate [Suminate M, a trade name, mfd. by Sumitomo Chemical Co., Ltd.] in benzene sufficiently dehydrated over anhydrous magnesium sulfate, followed by addition of 0.95 g (0.01 mole) of phenol as a masking agent. The Solution [I] was gradually added dropwise to the three-necked flask equipped with the reflux condenser so as to react at 60° C. for 30 minutes to prepare Solution [II].

Then, in a 2000-ml three-necked flask equipped with a dehydrating tube and a reflux condenser, 800 g of cyclohexanone dehydrated over anhydrous magnesium sulfate, 200 g of methyl ethyl ketone, and 4.0 g of tetrafunctional epoxy resin (XD 9053, a trade name, mfd. by E. I. du Pont de Nemours & Co.; epoxy equivalent 0.02 mole) were placed to give a solution, followed by addition of Solution [II] in an amount of 4 g to carry out the reaction at 150° C. for 1 hour. Then, 2.4 g (0.02 mole) of p-vinylphenyl polymer (Resin M, a trade name, mfd. by Maruzen Petrochemical Co., Ltd.) and 0.02 g of triethylamine tetraphenylborate (TEA-K, a trade name, mfd. by Hokuko Chemical Co., Ltd) as a curing accelerator were added to the reaction solution to give Solution [III].

On a disc made of an aluminum alloy and having a diameter of 5 inches, a plating film of Ni-P was formed as an undercoating layer, followed by formation of Cr, Co-Ni and carbon films, in this order, of individually 50 nm thick by sputtering. On the resulting surface, Solution [III] was coated so as to make a film of 30 nm thick after dried, followed by curing with heating at 230° C. for 1 hour in an atmosphere of $N_2$ to produce a magnetic disc.

The resulting magnetic disc was subjected to a durability test using a spherical surface sliding tester. That is, a disk was revolved at a peripheral speed of 10 m/sec at 25° C. On this revolving disc, a sapphire spherical slider (R 30) with a load of 10 g was placed and a total number of revolution until a magnetic film was broken was measured.

The results are shown in Table 1. As shown in Table 1, the total number of revolutions until the magnetic film is broken is more than 240,000 which is by far larger than Comparative Example 1 wherein a coating type lubricant is used.

EXAMPLE 2

In a 200-ml three-necked flask equipped with a dehydrating tube and a reflux condenser, 22 g (0.01 mole) of a compound of the formula:

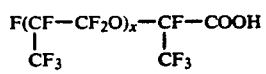

wherein x is 14 in average (Krytox 157FS, s trade name mfd. by E. I. du Pont de Nemours & Co.), sufficiently dehydrated over anhydrous magnesium sulfate and 100 g of trichlorotrifluoroethane sufficiently dehydrated over anhydrous magnesium sulfate were placed and sealed, followed by stirring.

On the other hand, Solution [IV] was prepared by dissolving 5.1 g (0.01 mole) of 1,6-diisocyanate-hexane [Sumidule 44V, a trade name, mfd. by Sumitomo Chemical Co., Ltd.] in benzene sufficiently dehydrated over anhydrous magnesium sulfate, followed by addition of 0.95 g (0.01 mole) of phenol as a masking agent. Solution [IV] was gradually added dropwise to the three-necked flask equipped with the reflux condenser so as to react at 60° C. for 30 minutes to prepare Solution [V].

Then, in a 2000-ml three-necked flask equipped with a dehydrating tube and a reflux condenser, 800 g of cyclohexanone dehydrated over anhydrous magnesium sulfate, 200 g of methyl ethyl ketone and 4.0 g of tetrafunctional epoxy resin (XD 9053, a trade name, mfd. by E. I. du Pont de Nemours & Co.; epoxy equivalent 0.02 mole) were placed to give a solution, followed by addition of Solution [V] in an amount of 4 g to carry out the reaction at 150° C. for 1 hour. Then, 2.4 g (0.02 mole) of p-vinylphenol polymer (Resin M) and 0.02 g of triethylamine tetraphenylborate (TEA-K) as a curing accelerator were added to the reaction solution to give Solution [VI].

A magnetic disc was produced in the same manner as described in Example 1 except for using Solution [VI] in place of Solution [III].

The resulting magnetic disc was subjected to the durability test in the same manner as described in Example 1. The results are shown in Table 1.

EXAMPLE 3

In a 200-ml three-necked flask equipped with a dehydrating tube and a reflux condenser, 22 g (0.01 mole) of a compound of the formula:

$$HOOC\text{-}\{(C_2F_4O)_x\text{—}(CF_2O)_y\text{—}CF_2\}\text{—}COOH$$

wherein x is 10 in average; and y is 14 in average, (Fomblin Z-DIAC, a trade name, mfd. by Montefluos Co., Ltd.), sufficiently dehydrated over anhydrous magnesium sulfate and 100 g of trichlorotrifluoroethane sufficiently dehydrated over anhydrous magnesium sulfate were placed and sealed, followed by stirring.

On the other hand, Solution [VII] was prepared by dissolving 5 g (0.02 mole) of diphenylmethane diisocyanate [Suminate M, a trade name, mfd. by Sumitomo Chemical Co., Ltd.] in benzene sufficiently dehydrated over anhydrous magnesium sulfate, followed by addition of 0.95 g (0.01 mole) of phenol as a masking agent. The Solution [VII] was gradually added dropwise to the three-necked flask equipped with the reflux condenser so as to react at 60° C. for 30 minutes to prepare Solution [VIII].

Then, in a 2000-ml three-necked flask equipped with a dehydrating tube and a reflux condenser, 800 g of cyclohexanone dehydrated over anhydrous magnesium sulfate, 200 g of methyl ethyl ketone, and 8.0 g of tetrafunctional epoxy resin (XD 9053, a trade name, mfd. by E. I. du Pont de Nemours & Co.; epoxy equivalent 0.04 mole) were placed to give a solution, followed by addition of Solution [VIII] in an amount of 4 g to carry out the reaction at 150° C. for 1 hour. Then, 4.8 g (0.04 mole) of p-vinylphenol polymer (Resin M) and 0.04 g of triethylamine tetraphenylborate (TEA-K) as a curing accelerator were added to the reaction solution to give Solution [IX].

A magnetic disc was produced in the same manner as described in Example 1 except for using Solution [IX] in place of Solution [III].

The resulting magnetic disc was subjected to the durability test in the same manner as described in Example 1. The results are shown in Table 1.

EXAMPLE 4

In a 500-ml three-necked flask deaerated and dehydrated, 25 ml (0.025 mole) of 1N LiAlH$_4$ dimethyl ether solution was shealed. Then, a dispersion obtained by dispersing 50 g (0.02 mole) of a compound of the formula

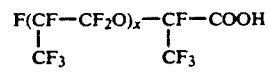

wherein x is 14 in average, in a mixed solvent of 200 g of trichlorotrifluoroethane and 50 g of dimethyl ether was added to the three-necked flask dropwise. The three-necked flask was subjected to stirring at room temperature for 5 hours for the reaction. The reaction product was cleaned with dilute hydrochloric acid. The resulting modified compound of the formula:

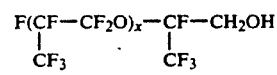

wherein x is 14 in average, in an amount of 25 g (0.01 mole) after sufficient dehydration was placed in a reactor equipped with a reflux condenser. After replacing the air in the reactor by nitrogen gas, 0.5 g (0.012 mole) of NaH (a 60% solution) and 20 ml of dehydrated trifluorotrichloroethane were placed in the reactor and stirred well.

On the other hand, 2.5 g (0.01 mole) of diphenylmethane diisocyanate [Suminate M] was dissolved in benzene sufficiently dehydrated over anhydrous magnesium sulfate, followed by addition of 0.95 g (0.01 mole) of phenol as a masking agent to prepare Solution [X]. The solution [X] was gradually added dropwise to the reactor so as to react at 60° C. for 30 minutes to prepare Solution [XI].

Then, in a 2000-ml three-necked flask equipped with a dehydrating tube and a reflux condenser, 800 g of cyclohexanone dehydrated over anhydrous magnesium sulfate, 200 g of methyl ethyl ketone and 4.0 g of tetrafunctional epoxy resin (XD 9053; epoxy equivalent 0.02 mole) were placed to give a solution, followed by addition of Solution [XI] in an amount of 4 g to carry out the reaction at 150° C. for 1 hour. Then, 2.4 g (0.02 mole) of p-vinylphenol polymer (Resin M) and 0.02 g of triethylamine tetraphenylborate (TEA-K) as a curing accelerator were added to the reaction solution to give Solution [XII].

A magnetic disc was produced in the same manner as described in Example 1 except for using Solution [XII] in place of Solution [III].

The resulting magnetic disc was subjected to the durability test in the same manner as described in Example 1. The results are shown in Table 1.

COMPARATIVE EXAMPLE 1

A magnetic disc was produced in the same manner as described in Example 1 except for using Krytox 143A which is a fluorine-containing coating type lubricant as disclosed in U.S. Pat. No. 3,490,946 in place of using Solution [III].

The resulting magnetic disc was subjected to the durability test in the same manner as described in Example 1. The results are shown in Table 1.

TABLE 1

| Example No. | No. of revolutions until magnetic recoding layer is broken |
|---|---|
| Example 1 | >240,000 |
| Example 2 | >240,000 |
| Example 3 | >240,000 |
| Example 4 | >240,000 |
| Comparative Example 1 | 23,000 |

EXAMPLE 5, COMPARATIVE EXAMPLE 2

Solution [III] was prepared in the same manner as described in Example 1.

Then, Solution [III] was coated on a glass substrate so as to make the film thickness 50 nm after dried, followed by thermal curing at 230° C. for 1 hour in a nitrogen gas atmosphere to form an organic coating film.

The surface tension of the thus produced organic coating film was measured using water and benzene. The results are shown in Table 2.

For comparison (Comparative Example 2), a coating solution was prepared by mixing 800 g of cyclohexanone, 200 g of methyl ethyl ketone, 4.0 g of tetrafunctional epoxy resin (XD 9053, a trade name, mfd. by E. I. du Pont de Nemours & Co.; epoxy equivalent 0.02 mole), 2.4 g (0.02 mole) of p-vinylphenol polymer (Resin M), and 0.02 g of triethylamine tetraphenylborate (TEA-K) as a curing accelerator. The resulting solution was coated on the glass substrate in the same manner as described in Example 5. The surface tension of the thus produced organic coating film was measured in the same manner as described in Example 5. The results are shown in Table 2.

TABLE 2

| | Contact angle (deg) at 25° C. | |
|---|---|---|
| Example No. | Water | Benzene |
| Example 5 | 105 | 32 |
| Comparative Example 2 | 63 | 0 |

As shown in Table 2, the contact angle of Example 5 is larger than that of Comparative Example 2, that is, the coating film of Example 5 is sufficiently excellent in water repellency and oil repellency.

EXAMPLE 6

A fluorine compound masked with phenol and represented by the formula:

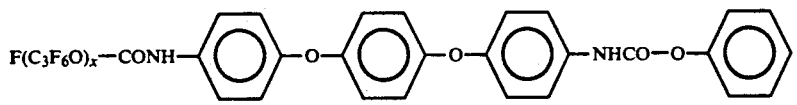

wherein x is 14 in average, was prepared in an amount of 0.64 g.

A solution was prepared by mixing 0.64 g of the fluorine compound, 800 g of methyl ethyl ketone, 100 g of cyclohexanone, 4.0 g of tetrafunctional epoxy resin (XD 9053; epoxy equivalent 0.02 mole), 2.4 g (0.02 mole) of p-vinylphenol polymer (Resin M), and 0.02 g of triethylene tetraphenylborate (TEA-K) as a curing accelerator. The resulting solution was coated on a glass substrate so as to make the film thickness 50 nm after dried, followed by thermal curing at 230° C. for 1 hour in a nitrogen gas atmosphere to form an organic coating film.

The surface tension of the thus produced organic coating film was measured using water and benzene. The results are shown in Table 3.

TABLE 3

| | Contact angle (deg.) at 25° C. | |
|---|---|---|
| Example No. | Water | Benzene |
| Example 6 | 105 | 32 |
| Comparative Example 2 | 63 | 0 |

As shown in Table 3, Example 6 is sufficiently excellent in water repellency and oil repellency.

EXAMPLE 7

Solution [IV] was prepared in the same manner as described in Example 3.

Then, Solution [IV] was coated on a glass substrate so as to make the film thickness 1 to 3 μm after dried, followed by thermal curing at 230° C. for 1 hour in a nitrogen gas atmosphere to form an organic coating film.

The organic coating film was subjected to infrared spectrum analysis to reveal that the absorption of the carbonyl of -NCO group at 2250 cm$^{-1}$ present before curing was vanished and absorptions due to the isocyanurate bond at 1710 cm$^{-1}$ and due to the oxazolidone bond at 1750 cm$^{-1}$ appeared. These facts show that the cured product has mainly isocyanurate bonds and oxazolidone bonds.

The surface tension of the thus produced organic coating film was measured using water and benzene. The results are shown in Table 4.

TABLE 4

| | Contact angle (deg.) at 25° C. | |
|---|---|---|
| Example No. | Water | Benzene |
| Example 7 | 104 | 30 |
| Comparative Example 2 | 63 | 0 |

As shown in Table 4, Example 7 is sufficiently excellent in water repellency and oil repellency.

What is claimed is:

1. A magnetic recording medium comprising a nonmagnetic substrate and formed thereon a thin magnetic film, said thin magnetic film being covered with a coating film made from a resin composition comprising an epoxy resin, a phenolic resin hardener for the epoxy resin and an isocyanate group-containing fluorine compound represented by the formula:

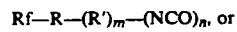

wherein Rf— is a perfluoropolyoxyalkyl group and —Rf— is a divalent residue thereof; R is a group of the formula: —CONH—, —OCONH—, or —CH₂OCONH—; R' is a bivalent or trivalent saturated aliphatic hydrocarbon or aromatic hydrocarbon group; m is zero or an integer of 1 or more; and n is an integer of 1 or 2, or an isocyanate group-containing fluorine compound represented by the formula:

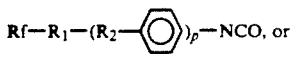

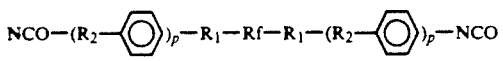

wherein Rf— and —Rf— are as defined above: R₁ is a direct bond, or —CH₂—, —CO—, or an amido bond; R₂ is a direct bond, or an ether bond, an ester bond, an amido bond, or —OC$_k$H$_{2k}$—, these bonds being able to be different ones when repeated; p is an integer of 1 or more; and k is an integer of 1 or 2, a surface of coating film being covered with Rf— or —Rf— groups having lubricating function.

2. A magnetic recording medium according to claim 1, wherein said composition contains 0.1 to 30% by weight of the isocyanate group-containing fluorine compound based on the weight of the epoxy resin.

3. A magnetic recording medium according to claim 1 wherein the phenolic resin hardener is a phenol-formaldehyde condensate, an o-cresol-formaldehyde condensate, p-cresolformaldehyde condensate, a xylenolformaldehyde condensate, a chlorophenol-formaldehyde condensate, a tert-butylphenolformaldehyde condensate, a p-octylphenol-formaldehyde condensate, a p-hydroxystyrene polymer or a polymerized p-vinyl phenol.

4. A magnetic recording medium according to claim 12, wherein Rf is F[CF(CF₃)—CF₂—O—]$_x$—CF(CF₃)—, {F[CF(CF₃)—CF₂—O—]$_x$—(CF₂O)$_y$—(CF₂)$_z$—}—, or [(C₂F₄O)$_y$—(CF₂O)$_z$—CF₂]—, wherein x, y and z are independently an integer of 1 or more, or F—[—CF(CF₃)—CF₂—O]$_x$—(CF₂—O—]$_y$X—(CR'R''—CF₂—CF₂—O—)$_x$—, or X'—(C₃F₆—O—)$_m$—(CF₂—O—)$_n$—[CF (CF₃)—O—]$_z$—, wherein m is an integer of 15 to 100; n is an integer of 1 to 80; and x, y and z are independently an integer of 1 or more; X is F, I, CF₃, CF₂, CF₂O, (CF₃)₂CFO, or CF₃OCF(CF₃)CF₂O;

R' is H or F; R'' is H or F; and X' is CF₃O, C₂F₅O or C₃F₇O.

5. A magnetic recording medium according to claim 1, wherein the isocyanate group-containing fluorine compound is

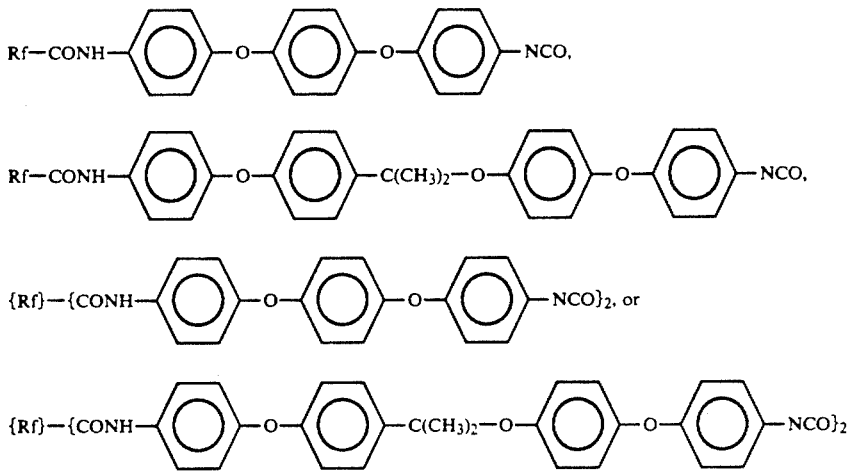

6. A magnetic recording medium comprising a non-magnetic substrate and formed thereon a thin magnetic film, said thin magnetic film being covered with a coating film made from a resin composition comprising an epoxy resin, a phenolic resin hardener for the epoxy resin and an isocyanate group-containing fluorine compound represented by the formula:

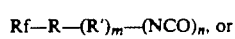

wherein Rf— is a perfluoropolyoxyalkyl group and —Rf— is a divalent residue thereof; R is a group of the formula: —CONH—, —OCONH—, or —CH₂OCONH—; R' is a bivalent or trivalent saturated aliphatic hydrocarbon or aromatic hydrocarbon group; m is zero or an integer of 1 or more; and n is an integer of 1 or 2, or an isocyanate group-containing fluorine compound represented by the formula:

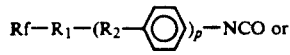

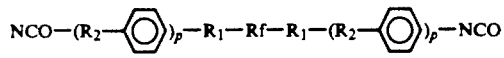

wherein Rf— and —Rf— are as defined above; R₁ is a direct bond, or —CH₂—, —CO— or an amido bond; R₂ is a direct bond, or an ether bond, an ester bond, an amido bond, or —OC$_k$H$_{2k}$—, these bonds being able to be different ones when repeated; p is an integer of 1 or more; and k is an integer of 1 or 2; said isocyanate group-containing fluorine compound being masked with a phenol compound before curing of the resin composition, and a surface of the coating film being covered with Rf—or —Rf— groups having lubricating function.

7. A magnetic recording medium according to claim 6, wherein said composition contains 0.1 to 30% by weight of the isocyanate group-containing fluorine compound based on the weight of the epoxy resin.

8. A magnetic recording medium according to claim 6, wherein the epoxy resin has functional groups in an amount of 2 to 100 equivalents per equivalent of isocyanate functional group.

9. A magnetic recording medium according to claim 6, wherein —Rf— is a group of the formula:

—{$(CF_2F_4O)_x$—$(CF_2O)_y$—$CF_2$}— wherein x is 10 in average; and y is 14 in average.

10. A magnetic recording medium according to claim 6, wherein —Rf— is a group of the formula:

—{F[CF(CF$_3$)—CF$_2$—O—]—CF$_2$—O—]$_x$—(CF$_2$O)$_y$—(CF$_2$)$_z$—}—, or

—[(C$_2$F$_4$O)$_y$—(CF$_2$O)$_z$—CF$_2$]— wherein x, y and z are independently an integer of 1 or more.

11. A magnetic recording medium according to claim 1, wherein —Rf— is a group of the formula:

—{F[CF(CF$_3$)—CF$_2$—O—]—CF$_2$—O—]$_x$—(CF$_2$O)$_y$—(CF$_2$)$_z$—}—, or

—[(C$_2$F$_4$O)$_y$—(CF$_2$O)$_z$—CF$_2$]— wherein x, y and z are independently an integer of 1 or more.

* * * * *